United States Patent
Chiu et al.

(10) Patent No.: US 9,003,184 B2
(45) Date of Patent: Apr. 7, 2015

(54) COMPUTING DEVICE AND METHOD FOR PROTECTING SOFTWARE OF THE COMPUTING DEVICE

(71) Applicant: Hon Hai Precision Industry Co., Ltd., New Taipei (TW)

(72) Inventors: Chui-Wen Chiu, New Taipei (TW); Chen-Liang Liang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/860,297

(22) Filed: Apr. 10, 2013

(65) Prior Publication Data

US 2013/0283048 A1 Oct. 24, 2013

(30) Foreign Application Priority Data

Apr. 20, 2012 (TW) .............................. 101114107 A

(51) Int. Cl.
*G06F 21/00* (2013.01)
*G06F 21/62* (2013.01)
*G06F 21/10* (2013.01)

(52) U.S. Cl.
CPC ............ *G06F 21/6209* (2013.01); *G06F 21/10* (2013.01); *G06F 2221/0797* (2013.01)

(58) Field of Classification Search
CPC . G06F 21/10; G06F 2221/0797; G06F 21/30; G06F 21/60; G06F 12/14; G06F 21/44
See application file for complete search history.

(56) References Cited

U.S. PATENT DOCUMENTS

| | | | |
|---|---|---|---|
| 5,754,761 A * | 5/1998 | Willsey | 726/30 |
| 2008/0181406 A1 * | 7/2008 | Iyer et al. | 380/277 |
| 2009/0070755 A1 * | 3/2009 | Taylor et al. | 717/168 |

* cited by examiner

*Primary Examiner* — Izunna Okeke
(74) *Attorney, Agent, or Firm* — Novak Druce Connolly Bove + Quigg LLP

(57) ABSTRACT

In a method for protecting software of a computing device, a hypertext preprocessor (PHP) software program of the computing device is encrypted using an encryption rule to obtain an encrypted file. When the encrypted file needs to be decrypted, the method determines whether a predetermined hardware lock is connected to the computing device. When the predetermined hardware lock is not connected to the computing device, the method displays a prompt that indicates the predetermined hardware lock is not connected to the computing device. When the predetermined hardware lock is connected to the computing device, the method decrypts the encrypted file with a decryption rule corresponding to the encryption rule.

12 Claims, 2 Drawing Sheets

COMPUTING DEVICE AND METHOD FOR PROTECTING SOFTWARE OF THE COMPUTING DEVICE

BACKGROUND

1. Technical Field

Embodiments of the present disclosure generally relate to software protection technique, and more specifically to a system and method for protecting a software program written in hypertext preprocessor in a computing device.

2. Description of Related Art

The hypertext preprocessor (PHP) is a scripting language with a literal translation language. After a software program written in PHP is installed in a computing device, the software program is visible to users. In order to avoid the software program from being leaked, the software program can be encrypted. However, the encrypted software program may be decrypted easily. Easy decryption may result in the software program having a low security. Therefore, there is room for improvement to enhance the security of the software program.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module" as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of non-transitory computer-readable storage medium or other storage system. The non-transitory computer-readable storage medium may include CDs, DVDs, BLU-RAY, flash memory, and hard disk drives.

Figure 1:
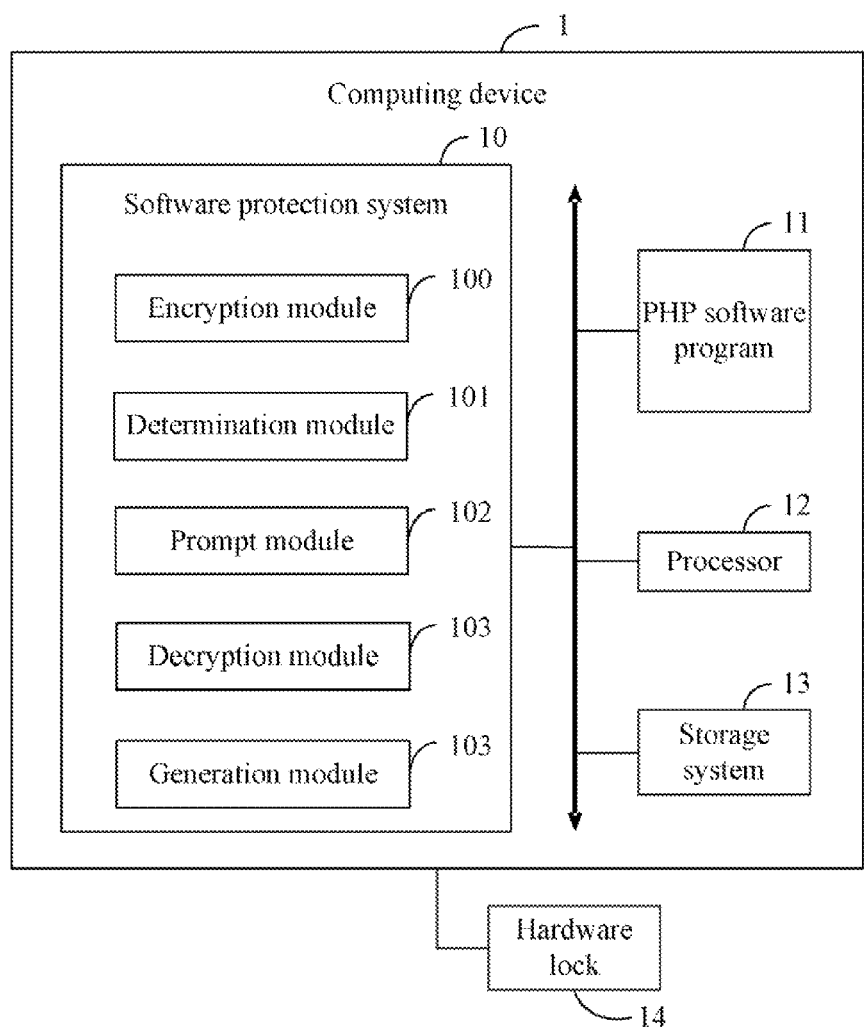
FIG. 1 is a block diagram of one embodiment of a computing device including a software protection system.

FIG. 1 is a block diagram of one embodiment of a computing device 1 including a software protection system 10. The computing device 1 may be a computer, an application server, and/or a personal digital assistant (PDA), for example. In one embodiment, the computing device 1 includes a hypertext preprocessor (PHP) software program 11, where the PHP software program 11 is a software program written in PHP and is installed in the computing device 1. In one embodiment, the PHP software program 11 includes a software identification code, where the software identification code identifies the PHP software program 11.

The computing device 1 further includes a processor 12 and a storage system 13. The processor 12 executes one or more computerized codes and other applications for the computing device 1, to provide functions of the software protection system 10. The storage system 13 stores data of the computing device 1. In one embodiment, the storage system 13 may be an internal storage device, such as a random access memory (RAM) for temporary storage of information, and/or a read only memory (ROM) for permanent storage of information. In some embodiments, the storage system 13 may also be an external storage device, such as an external hard disk, a storage card, or a data storage medium.

The computing device 1 connects with a hardware lock 14 through a port of the computing device 1, where the port may be a parallel port, a serial port, an universal serial bus (USB) port, or a FIREWIRE port, for example. The hardware lock 14 is a hardware dongle used for software protection and includes a hardware identification number, where the hardware identification number is stored in the hardware lock 14. The hardware identification number identifies the hardware lock 14. Each PHP software program 11 corresponds to a predetermined hardware lock 14. Only when the predetermined hardware lock 14 is connected to the computing device 1, the PHP software program 11 can be decrypted according to a decryption rule. The predetermined hardware lock 14 is user-determined or pre-determined, a hardware lock 14 may use a hardware identification number "20", for example. Thus, the predetermined hardware lock 14 is disconnected from the computing device 1 when users want to protect the PHP software program 11 from being decrypted.

The software protection system 10 includes a plurality of function modules to protect the PHP software program 10 from being decrypted when the hardware lock 14 is disconnected from the computing device 1. In one embodiment, the software protection system 11 includes an encryption module 100, a determination module 101, a prompt module 102, a decryption module 103, and a generation module 104. The modules 100-104 comprise computerized codes in the form of one or more programs that are stored in the storage system 13 and executed by the processor 12 to provide functions for the modules, the functions are illustrated in FIG. 2.

Figure 2:
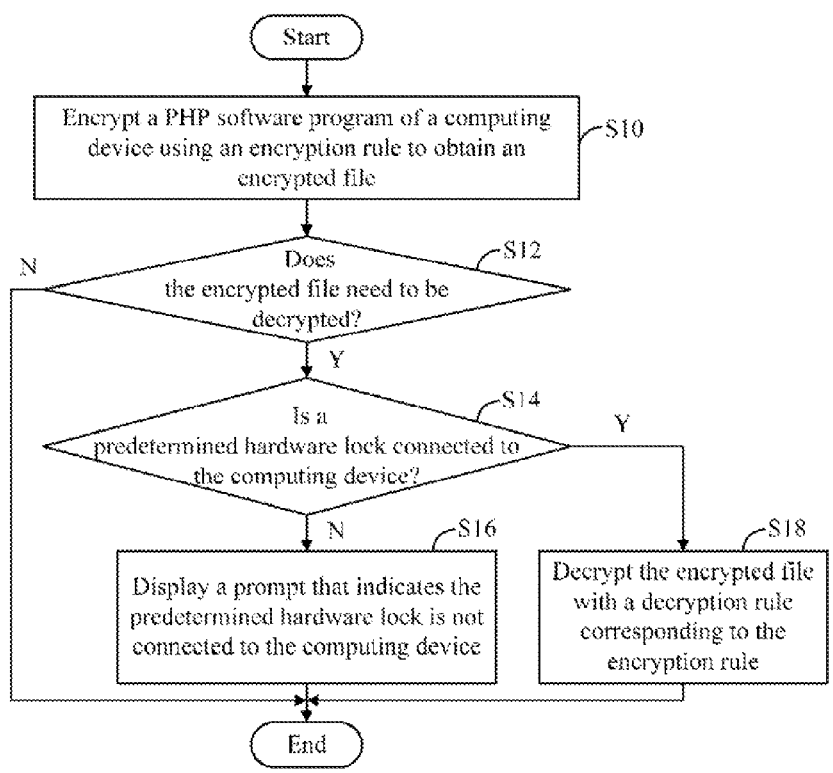
FIG. 2 is a flowchart of one embodiment of a method for protecting software in the computing device of FIG. 1.

FIG. 2 is a flowchart of one embodiment of a method of protecting software. The method can be performed by execution of a computer-readable program code by at least one processor 12 of the computing device 1 shown in FIG. 1. Depending on the embodiment, additional blocks in the flowchart of FIG. 2 may be added, others removed, and the ordering of the blocks may be changed.

In step S10, the encryption module 100 encrypts the PHP software program 11 installed in the computing device 1 using an encryption rule to obtain an encrypted file. In one embodiment, the encrypted file includes the encrypted PHP software program 11, a hardware identification number of the predetermined hardware lock 14, and the software identification code of the PHP software program 11. The encryption rule may be an existing encryption algorithm in the ordinary art, or an encryption method that is defined by a user. The encryption algorithm is a digital signature algorithm (DSA), a secure hash algorithm (SHA), an international data encryption algorithm (IDEA), or a data encryption standard (DES) algorithm, for example.

After the encryption module 100 encrypts the PHP software program 11, the generation module 104 generates a decryption rule corresponding to the encryption rule to decrypt the encrypted file. The decryption rule is stored in the storage system 13. When the encryption rule is the existing encryption algorithm, the decryption rule is a decryption algorithm corresponding to the encryption algorithm. When the encryption rule is a encryption method that is defined by the user, the decryption rule is a decryption method corresponding to the encryption method. In one embodiment, the decryption rule also includes the software identification code of the PHP software program 11.

In step S12, the determination module 101 determines whether the encrypted file needs to be decrypted. If the encrypted file needs to be decrypted, step S14 is implemented. If the encrypted file does not need to be decrypted, the process ends. In one embodiment, the determination module 101 determines whether the encrypted PHP software program 11 is invoked by the computing device 1. If the encrypted PHP software program 11 is invoked by the computing device 1, the determination module 101 determines that the encrypted file needs to be decrypted. If the encrypted PHP software program 11 is not invoked by the computing device 1, the determination module 101 determines that the encrypted file does not need to be decrypted.

In step S14, the determination module 101 determines whether a predetermined hardware lock 14 is connected to the computing device 1. If the predetermined hardware lock 14 is connected to the computing device 1, step S18 is implemented. If the predetermined hardware lock 14 is not connected to the computing device 1, step S16 is implemented.

In one embodiment, the determination module 101 obtains a hardware identification number stored in the connected hardware lock 14 through a port of the computing device 1. The determination module 101 determines whether the hardware identification number of the connected hardware lock 14 and the hardware identification number stored in the encryption file are the same. If the hardware identification number of the connected hardware lock 14 and the hardware identification number stored in the encryption file are the same, the determination module 101 determines that the predetermined hardware lock 14 is connected to the computing device 1. If the hardware identification number of the connected hardware lock 14 and the hardware identification number stored in the encryption file are not the same, the determination module 101 determines that the predetermined hardware lock 14 is not connected to the computing device 1. If no hardware lock 14 is connected to the computing device 1, the determination module 101 obtains a null value from the identification number of the hardware lock 14.

In step S16, the prompt module 102 displays a prompt that indicates the predetermined hardware lock 14 is not connected to the computing device 1. The prompt may include an information of failure decryption, for example.

In step S18, the decryption module 103 decrypts the encrypted file with a decryption rule corresponding to the encryption rule. In one embodiment, the decryption module 103 traverses all decryption rules stored in the computing device 1 to search a decryption rule with the same software identification code of the PHP software program 11. If the decryption module 103 searches the decryption rule with the same software identification code of the PHP software program 11, the decryption module 103 uses the decryption rule with the same software identification code of the PHP software program 11 to decrypt the encrypted file. If the decryption module 103 does not search the decryption rule with the same software identification code of the PHP software program 11, the decryption module 103 displays a prompt that indicates the decryption rule corresponding to the encryption rule does not exist.

In this disclosure, the PHP software program 11 is encrypted and decrypted in the computing device 1. In other embodiment, the PHP software program 11 is encrypted and decrypted in different devices, such as a first computing device and a second computing device. The PHP software program 11 is encrypted in a first computing device, the encrypted file and the decryption rule are copied to a second computing device, and the encrypted file is decrypted in the second computing device.

In this disclosure, before the PHP software program 11 is decrypted, whether the predetermined hardware lock 14 is connected to the computing device 1 is determined. This disclosure can enhance the security of decryption through the combination protection of hardware and software.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included within the scope of this disclosure and the described inventive embodiments, and the present disclosure is protected by the following claims.

What is claimed is:

1. A computerized-method for protecting software of a computing device, the method comprising:
    encrypting a hypertext preprocessor (PHP) software program of the computing device using an encryption rule to obtain an encrypted file;
    generating a decryption rule corresponding to the encryption rule to decrypt the encrypted file;
    storing the decryption rule corresponding to the encryption rule to a storage system of the computing device;
    determining whether a predetermined hardware lock is connected to the computing device when the encrypted file is decrypted;
    displaying a prompt that indicates the predetermined hardware lock is not connected to the computing device when the predetermined hardware lock is not connected to the computing device;
    searching the decryption rule corresponding to the encryption rule from the storage system when the predetermined hardware lock is connected to the computing device; and
    decrypting the encrypted file with the decryption rule corresponding to the encryption rule;
    wherein the encrypted file comprises the encrypted PHP software program, a hardware identification number of the predetermined hardware lock, and a software identification code of the PHP software program.

2. The method as claimed in claim 1,
    wherein the decryption rule comprises a software identification code of the PHP software program.

3. The method as claimed in claim 1, wherein the determination step comprises:
    obtaining a hardware identification number stored in the connected hardware lock through a port of the computing device;
    determining whether a hardware identification number of the connected hardware lock and a hardware identification number stored in the encryption file are the same;
    determining that the predetermined hardware lock is connected to the computing device when the hardware identification number of the connected hardware lock and the hardware identification number stored in the encryption file are the same; and
    determining that the predetermined hardware lock is not connected to the computing device when the hardware identification number of the connected hardware lock and the hardware identification number stored in the encryption file are not the same.

4. The method as claimed in claim 1, wherein the searching step comprises:

traversing all decryption rules stored in the computing device to search a decryption rule with a same software identification code of the PHP software program;

using the decryption rule with the same software identification code of the PHP software program to decrypt the encrypted file when the decryption rule with the same software identification code of the PHP software program is searched; and displaying a prompt that indicates the decryption rule corresponding to the encryption rule does not exist when the decryption rule with the same software identification code of the PHP software program is not searched.

5. A non-transitory computer readable storage medium storing a set of instructions, when executed by at least one processor of a computing device, cause the at least one processor to perform a method for protecting software of the computing device, the method comprising:

encrypting a hypertext preprocessor (PHP) software program of the computing device using an encryption rule to obtain an encrypted file;

generating a decryption rule corresponding to the encryption rule to decrypt the encrypted file;

storing the decryption rule corresponding to the encryption rule to a storage system of the computing device;

determining whether a predetermined hardware lock is connected to the computing device when the encrypted file is decrypted;

displaying a prompt that indicates the predetermined hardware lock is not connected to the computing device when the predetermined hardware lock is not connected to the computing device;

searching the decryption rule corresponding to the encryption rule from the storage system when the predetermined hardware lock is connected to the computing device; and decrypting the encrypted file with the decryption rule corresponding to the encryption rule;

wherein the encrypted file comprises the encrypted PHP software program, a hardware identification number of the predetermined hardware lock, and a software identification code of the PHP software program.

6. The storage medium as claimed in claim 5, wherein the decryption rule comprises a software identification code of the PHP software program.

7. The storage medium as claimed in claim 5, wherein the determination step comprises:

obtaining a hardware identification number stored in the connected hardware lock through a port of the computing device;

determining whether a hardware identification number of the connected hardware lock and a hardware identification number stored in the encryption file are the same;

determining that the predetermined hardware lock is connected to the computing device when the hardware identification number of the connected hardware lock and the hardware identification number stored in the encryption file are the same; and determining that the predetermined hardware lock is not connected to the computing device when the hardware identification number of the connected hardware lock and the hardware identification number stored in the encryption file are not the same.

8. The storage medium as claimed in claim 5, wherein the searching step comprises:

traversing all decryption rules stored in the computing device to search a decryption rule with a same software identification code of the PHP software program;

using the decryption rule with the same software identification code of the PHP software program to decrypt the encrypted file when the decryption rule with the same software identification code of the PHP software program is searched; and displaying a prompt that indicates the decryption rule corresponding to the encryption rule does not exist when the decryption rule with the same software identification code of the PHP software program is not searched.

9. A computing device, comprising:

at least one processor; and a storage system that stores one or more programs, when executed by the at least one processor, cause the at least one processor to:

encrypt a hypertext preprocessor (PHP) software program of the computing device using an encryption rule to obtain an encrypted file;

generate a decryption rule corresponding to the encryption rule to decrypt the encrypted file;

store the decryption rule corresponding to the encryption rule to the storage system;

determine whether a predetermined hardware lock is connected to the computing device when the encrypted file is decrypted;

display a prompt that indicates the predetermined hardware lock is not connected to the computing device when the predetermined hardware lock is not connected to the computing device;

search the decryption rule corresponding to the encryption rule from the storage system when the predetermined hardware lock is connected to the computing device; and decrypt the encrypted file with the decryption rule corresponding to the encryption;

wherein the encrypted file comprises the encrypted PHP software program, a hardware identification number of the predetermined hardware lock, and a software identification code of the PHP software program.

10. The computing device as claimed in claim 9, wherein the decryption rule comprises a software identification code of the PHP software program.

11. The computing device as claimed in claim 9, wherein whether the predetermined hardware lock is connected to the computing device is determined by:

obtaining a hardware identification number stored in the connected hardware lock through a port of the computing device;

determining whether a hardware identification number of the connected hardware lock and a hardware identification number stored in the encryption file are the same;

determining that the predetermined hardware lock is connected to the computing device when the hardware identification number of the connected hardware lock and the hardware identification number stored in the encryption file are the same; and determining that the predetermined hardware lock is not connected to the computing device when the hardware identification number of the connected hardware lock and the hardware identification number stored in the encryption file are not the same.

12. The computing device as claimed in claim 9, wherein the decryption rule corresponding to the encryption rule is searched from the storage system by:

traversing all decryption rules stored in the computing device to search a decryption rule with a same software identification code of the PHP software program;

using the decryption rule with the same software identification code of the PHP software program to decrypt the encrypted file when the decryption rule with the same software identification code of the PHP software program is searched; and displaying a prompt that indicates the decryption rule corresponding to the encryption rule does not exist when the decryption rule with the same software identification code of the PHP software program is not searched.

\* \* \* \* \*